(12) United States Patent
Green

(10) Patent No.: US 9,689,528 B2
(45) Date of Patent: Jun. 27, 2017

(54) MULTIUSE BRACKET AND SUPPORT DEVICE

(71) Applicant: Philip Green, Middle Island, NY (US)

(72) Inventor: Philip Green, Middle Island, NY (US)

( * ) Notice: Subject to any disclaimer, the term of this patent is extended or adjusted under 35 U.S.C. 154(b) by 0 days.

(21) Appl. No.: 14/923,552

(22) Filed: Oct. 27, 2015

(65) Prior Publication Data
US 2017/0114952 A1 Apr. 27, 2017

(51) Int. Cl.
| | |
|---|---|
| *F16B 2/08* | (2006.01) |
| *F16M 13/02* | (2006.01) |
| *A47G 23/02* | (2006.01) |
| *F16B 1/00* | (2006.01) |

(52) U.S. Cl.
CPC ....... *F16M 13/022* (2013.01); *A47G 23/0216* (2013.01); *F16B 1/00* (2013.01); *F16B 2/08* (2013.01); *F16B 2001/0028* (2013.01)

(58) Field of Classification Search
CPC ...... F16M 13/02; F16M 13/022; F16M 13/00; F16M 11/10; F16M 11/14; F16M 11/08; F16M 2200/022; F16M 11/041; F16M 11/2014; F16M 11/06; F16M 11/28; F16M 2200/024; F16M 11/04; F16M 11/2092
USPC .......... 248/228.8, 229.17, 230.8, 311.2, 315; 220/148.4, 578; 211/107, 112
See application file for complete search history.

(56) References Cited

U.S. PATENT DOCUMENTS

| | | | | |
|---|---|---|---|---|
| 903,593 | A | * 11/1908 | Lowendahl | A47B 21/045 211/110 |
| 1,473,318 | A | * 11/1923 | Ranson | F24C 15/12 211/107 |
| D348,772 | S | 7/1994 | Minx | |
| 5,474,273 | A | 12/1995 | Vinal | |
| 5,533,718 | A | * 7/1996 | Gray | F16M 13/00 269/296 |
| 6,412,741 | B1 | 7/2002 | Olivero | |
| 6,565,052 | B1 | * 5/2003 | Doublet | G09F 7/18 248/218.4 |
| 6,708,832 | B1 | * 3/2004 | Hannon | A47G 7/045 182/187 |
| 6,752,279 | B1 | 6/2004 | Dwyer | |
| 7,552,904 | B2 | 6/2009 | Zehnder et al. | |
| 8,407,936 | B1 | 4/2013 | Lee, Jr. | |
| 2002/0084393 | A1 | * 7/2002 | Torres | A63B 71/04 248/230.8 |
| 2002/0145096 | A1 | 10/2002 | Eubanks | |

* cited by examiner

*Primary Examiner* — Steven Marsh

(57) ABSTRACT

A multiuse bracket and support device for securing supports to a structure includes a band, which is flexible, that has a first end, a second end, opposing side edges, a front and a back. Each of a plurality of first couplers is coupled to the band. A first fastener is coupled to the back proximate to the first end, and a second fastener is coupled to the front proximate to the second end. The second fastener is complimentary to the first fastener. Each of a plurality of brackets comprises a second coupler coupled to a support. The second coupler is complimentary to the first coupler.

18 Claims, 6 Drawing Sheets

MULTIUSE BRACKET AND SUPPORT DEVICE

BACKGROUND OF THE DISCLOSURE

Field of the Disclosure

The disclosure relates to bracket and support devices and more particularly pertains to a new bracket and support device for securing supports to a structure.

SUMMARY OF THE DISCLOSURE

An embodiment of the disclosure meets the needs presented above by generally comprising a band, which is flexible, that has a first end, a second end, opposing side edges, a front and a back. Each of a plurality of first couplers is coupled to the band. A first fastener is coupled to the back proximate to the first end, and a second fastener is coupled to the front proximate to the second end. The second fastener is complimentary to the first fastener. Each of a plurality of brackets comprises a second coupler coupled to a support. The second coupler is complimentary to the first coupler.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
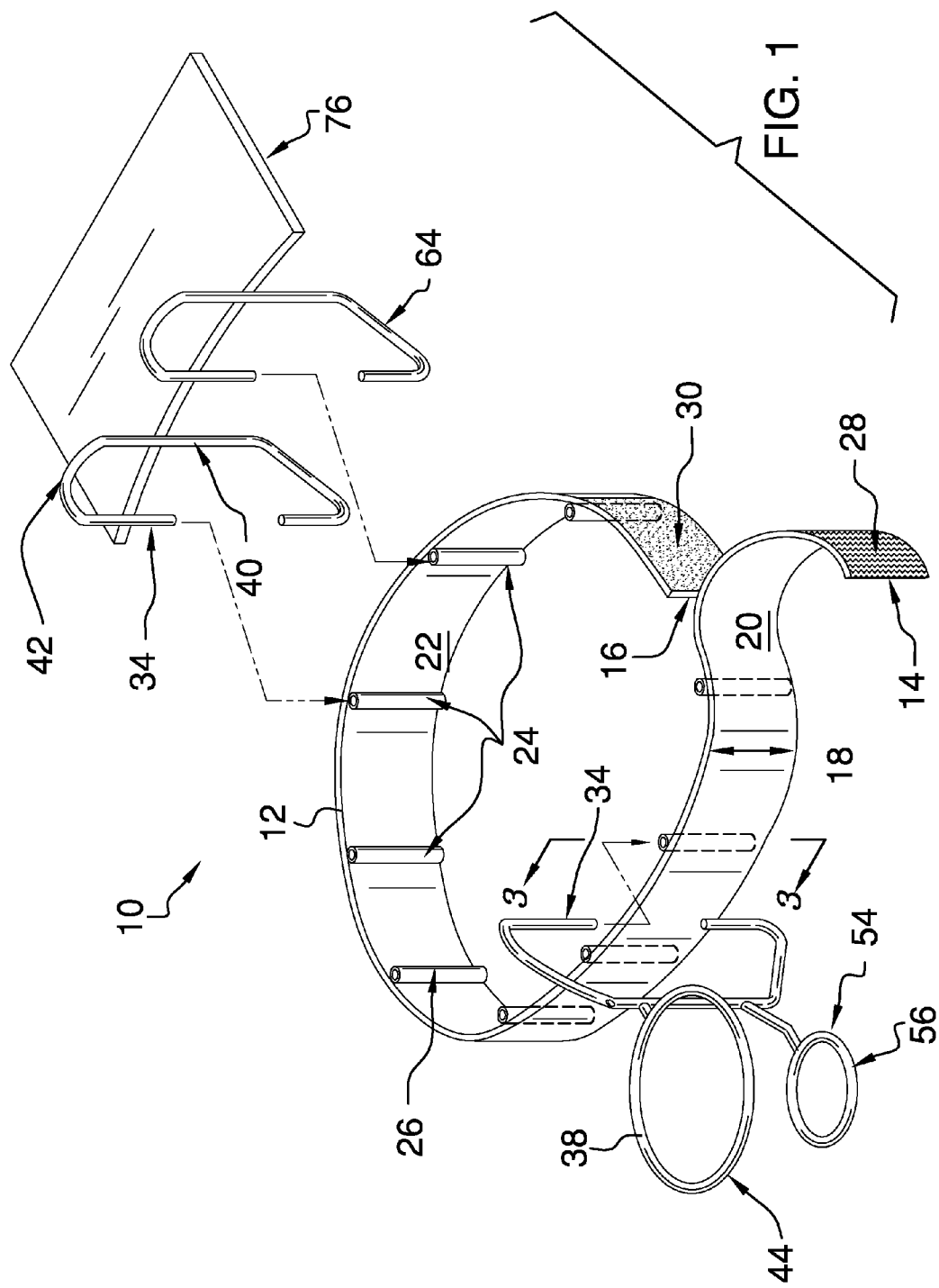
FIG. 1 is an exploded isometric perspective view of a multiuse bracket and support device according to an embodiment of the disclosure.
Figure 2:
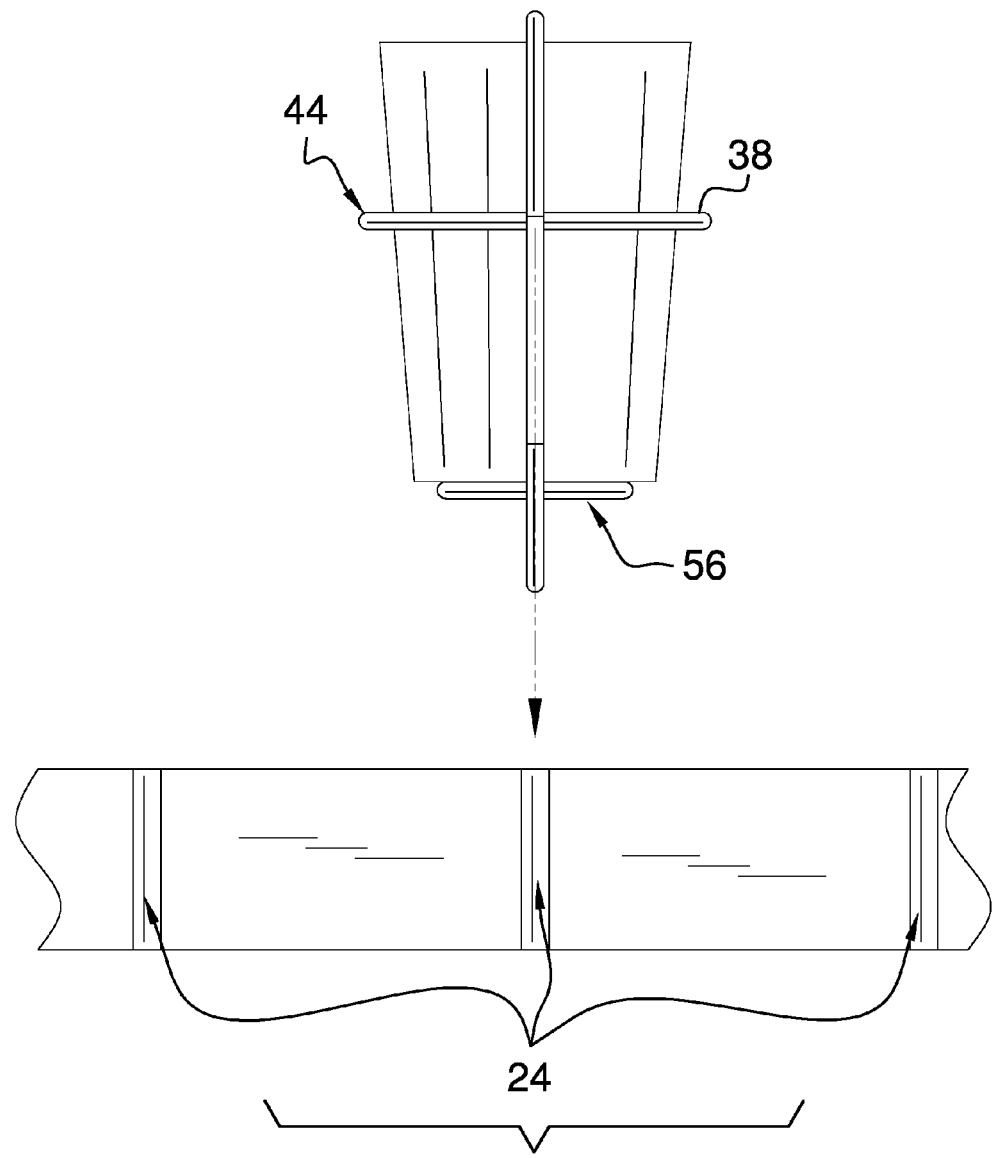
FIG. 2 is a back view of an embodiment of the disclosure.
Figure 3:
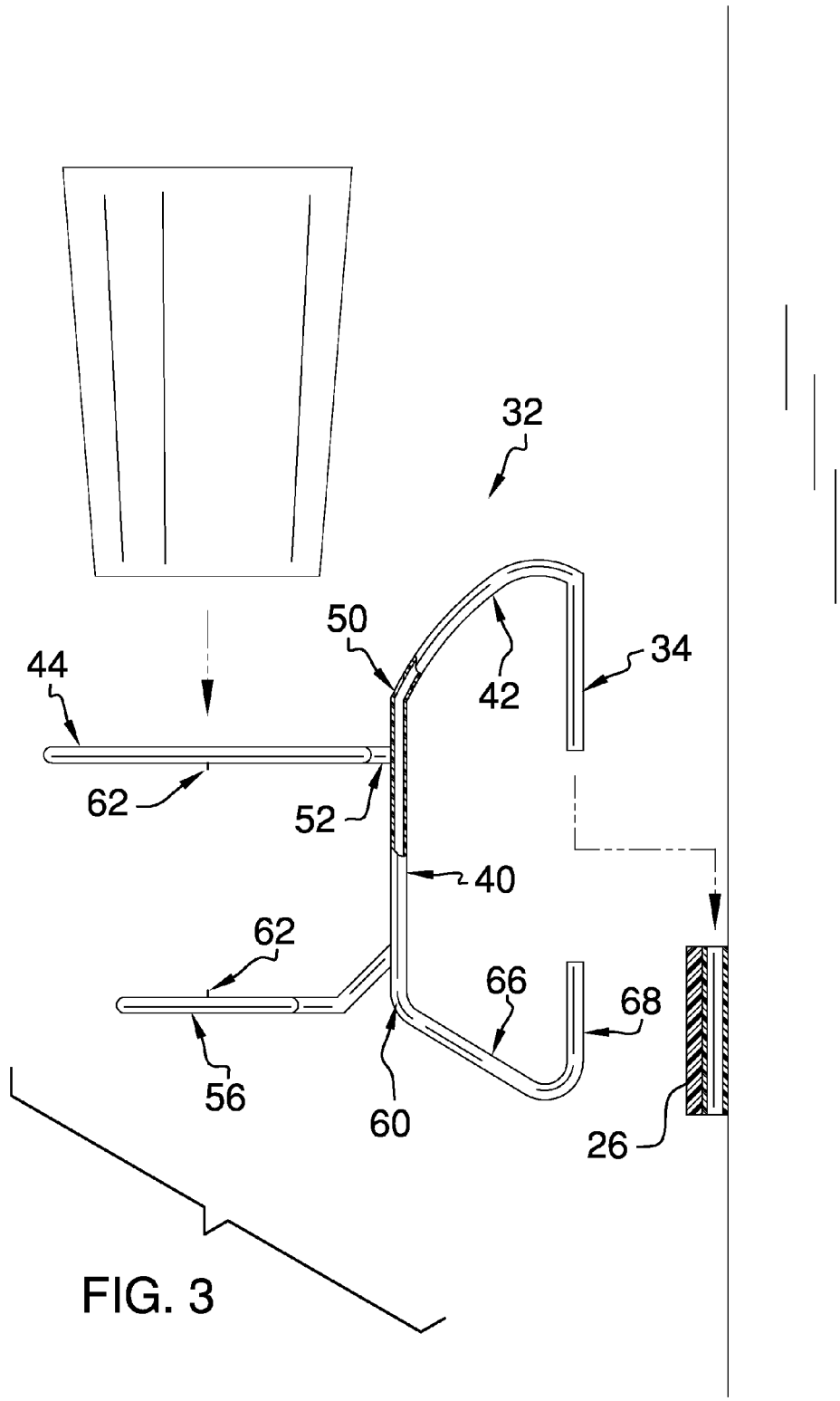
FIG. 3 is a cross-sectional view of an embodiment of the disclosure.
Figure 4:
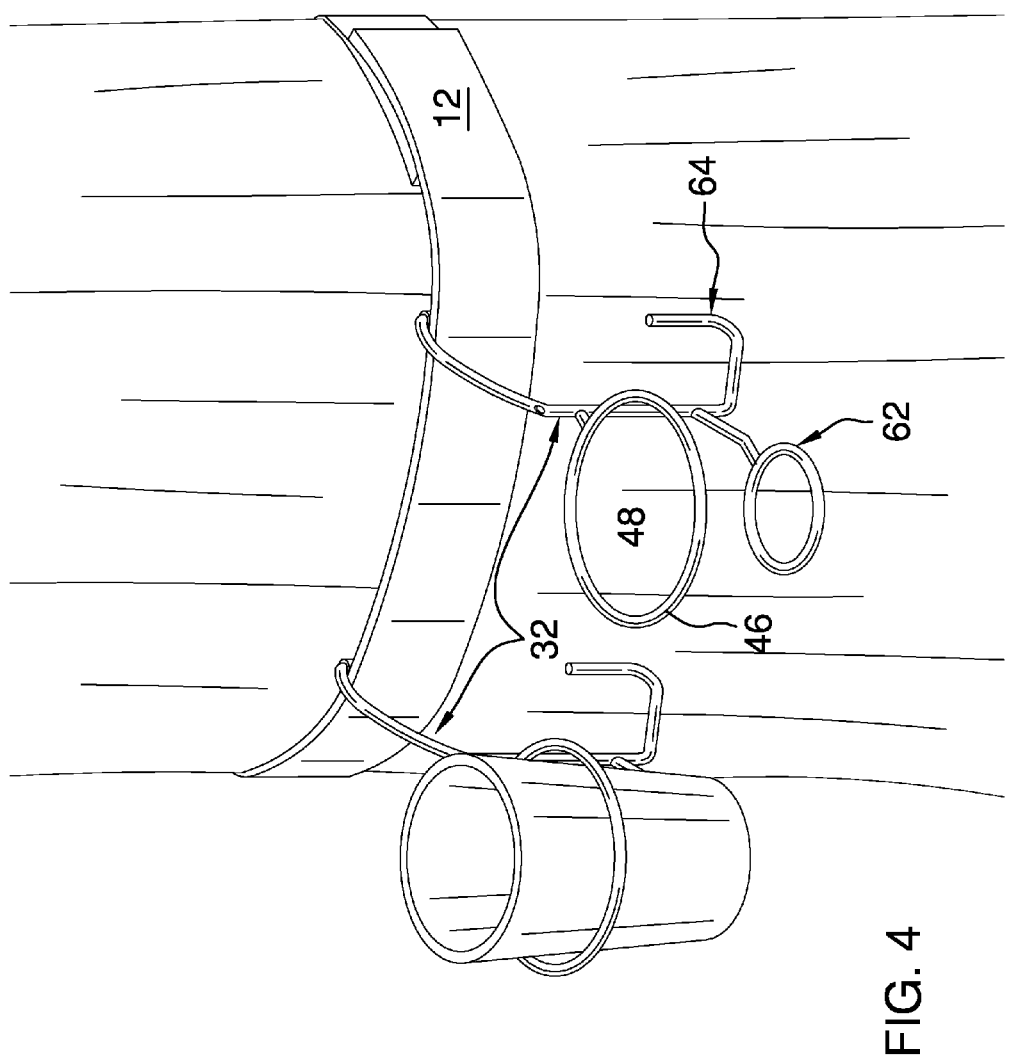
FIG. 4 is an in-use view of an embodiment of the disclosure.
Figure 5:
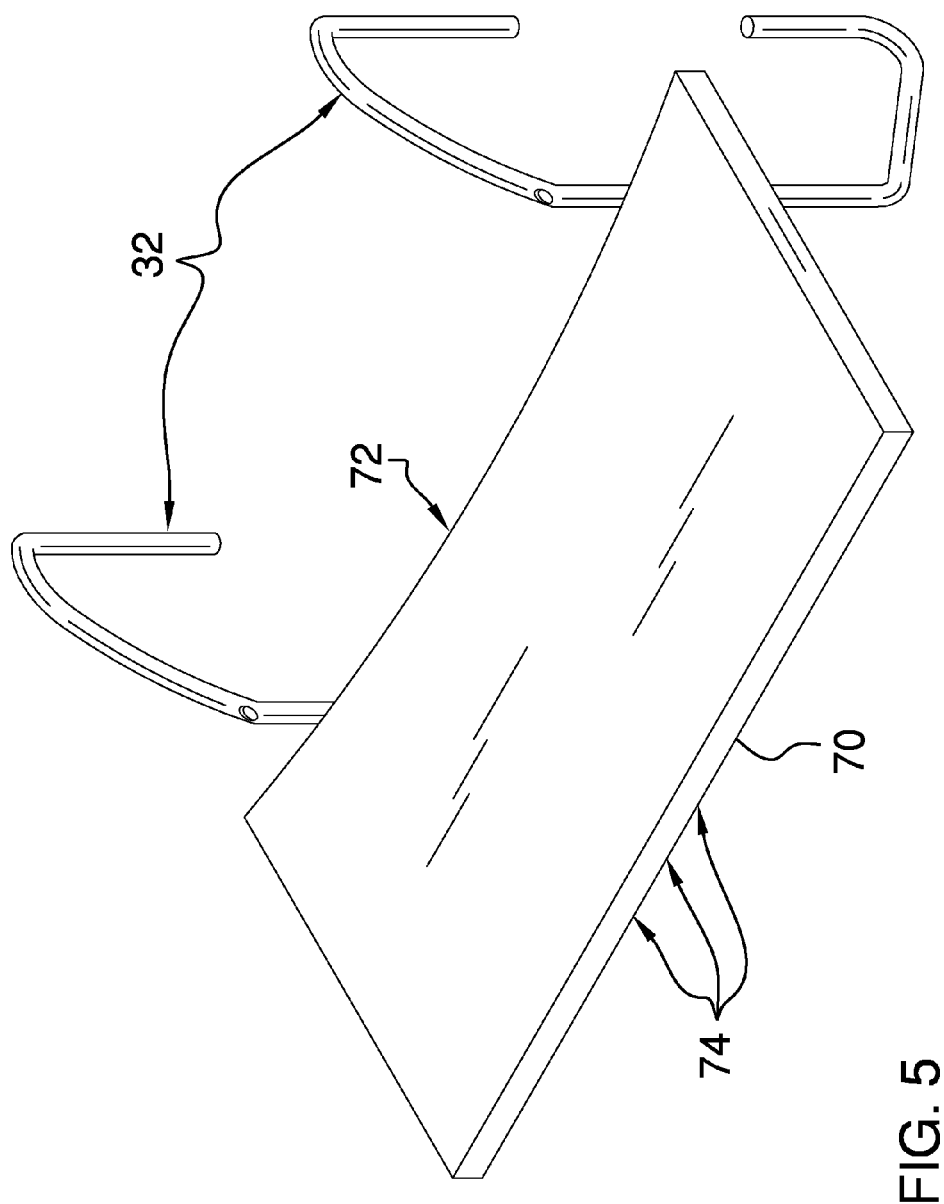
FIG. 5 is an isometric perspective view of an embodiment of the disclosure.
Figure 6:
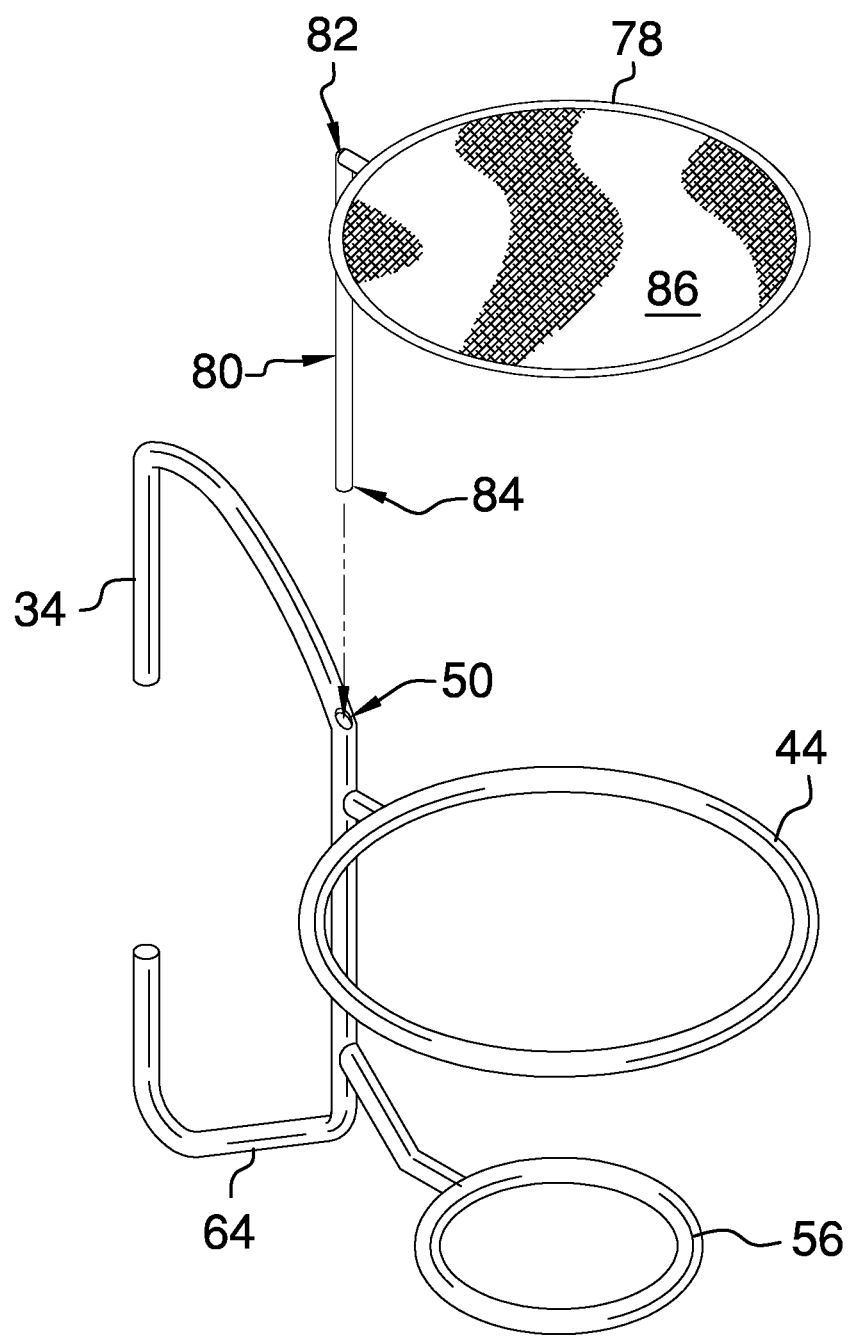
FIG. 6 is an isometric perspective view of an embodiment of the disclosure.

With reference now to the drawings, and in particular to FIGS. 1 through 6 thereof, a new bracket and support device embodying the principles and concepts of an embodiment of the disclosure and generally designated by the reference numeral 10 will be described.

As best illustrated in FIGS. 1 through 6, the multiuse bracket and support device 10 generally comprises a band 12, which is flexible, that has a first end 14, a second end 16, opposing side edges 18, a front 20 and a back 22. Each of a plurality of first couplers 24 is coupled to the band 12. The first couplers 24 comprise tubes 26 that are hollow. The tubes 26 are coupled to the back 22 and extend between the opposing side edges 18. The plurality of first couplers 24 comprises of between one and fifteen first couplers 24. Preferably, the plurality of first couplers 24 comprises of between four and twelve first couplers 24. More preferably, the plurality of first couplers 24 comprises of between six and nine first couplers 24. The first couplers 24 are substantially evenly spaced along the band 12.

A first fastener 28 is coupled to the back 22 proximate to the first end 14. A second fastener 30 is coupled to the front 20 proximate to the second end 16. The second fastener 30 is complimentary to the first fastener 28. The first fastener 28 and the second fastener 30 are selected from the group of fasteners consisting of Velcro type hook and Velcro type loop fasteners. The second fastener 30 may extend along the front 20 from the second end 16 to proximate to the first end 14. The band 12 can be positioned by the user around structures such as posts and trees that have a variety of diameters. The second fastener 30 is positioned to couple to the first fastener 28 to secure the band 12 to the structure selected by the user.

Each of a plurality of brackets 32 comprises a second coupler 34 coupled to a support 36. The second couplers 34 are complimentary to the first couplers 24. The support 36 may comprise a cup holder 38. The plurality of brackets 32 comprises between one and fifteen brackets 32. Preferably, the plurality of brackets 32 comprises between four and twelve brackets 32. More preferably, the plurality of brackets 32 comprises between six and nine brackets 32. Each second coupler 34 is tubular and cross-sectionally smaller than the first coupler 24, such that each second coupler 34 is insertable into a respective first coupler 24. The tubes 26 and the second couplers 34 may be cylindrical. The support 36 comprises a vertical member 40, which is coupled to a respective one of the second couplers 34 through an arcuate separator 42. The vertical member 40 and the respective one of the second couplers 34 are substantially parallel and also substantially coplanar with the arcuate separator 42.

A stay 44, which has a perimeter 46 defining an opening 48, is coupled proximate to a top 50 of the vertical member 40. The stay 44 extends transversely from the vertical member 40 relative to the arcuate separator 42. The stay 44 is circular. The stay 44 may comprise an extender 52 positioned between and coupled to the perimeter 46 and the vertical member 40.

A rest 54 that comprises a ring 56 is coupled to a spacer 58. The spacer 58 is coupled proximate to a bottom 60 of the vertical member 40. The ring 56 and the stay 44 are in substantially parallel planes, such that a center 61 of the ring 56 is in substantial alignment with a central point 62 of the stay 44. The rest 54 is configured to engage the bottom of a container inserted through the opening 48 of the stay 44. A brace 64 is coupled to the bottom 60 of the vertical member 40. The brace 64 extends from the vertical member 40 transversely relative to the rest 54, such that the brace 64 is configured to engage the structure to stabilize the bracket 32. The brace 64 comprises a lateral 66 that is coupled to and extends between the vertical member 40 and a contact member 68. The contact member 68 is substantially parallel to the vertical member 40. The brace 64 is substantially coplanar with both the vertical member 40 and the first coupler 24.

The device 10 also includes a tray 70, which is rigid and planer, has a back rim 72 that is arcuate. A plurality of connectors 74 is coupled to a lower face 76 of the tray 70.

The connectors 74 are complimentary to the supports 36, such that the supports 36 are positioned to engage the connectors 74 to couple the tray 70 to at least one of the plurality of brackets 32. Preferably, the plurality of connectors 74 comprises two connectors 74, such that the tray 70 is couplable to two supports 36.

Each of a plurality of protectors 78 comprises a post 80 that has a first terminus 82 and a second terminus 84. A cover 86 is coupled to the first terminus 82. The top 50 of the vertical member 40 is open and the second terminus 84 of the post 80 is insertable into the top 50. The cover 86 is substantially planer and rigid. Preferably, the cover 86 is complimentary to the stay 44. The top 50 is positioned to receive the post 80 such that the cover 86 will rest on a container placed in the opening 48 of the stay 44.

In use, the band 12 is attachable to a structure with each first coupler 24 positioned to couple to a respective the second coupler 34, such that the supports 36 are positioned to allow the user to secure items to, or rest items on, the supports 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multiuse bracket and support device comprising:
   a band, said band being flexible, said band have a first end, a second end, opposing side edges, a front and a back;
   a plurality of first couplers, each said first coupler being coupled to said band;
   a first fastener, said first fastener being coupled to said back proximate to said first end;
   a second fastener, said second fastener being coupled to said front proximate to said second end, said second fastener being complimentary to said first fastener;
   a plurality of brackets, each said bracket comprising a second coupler coupled to a support, said second coupler being complimentary to said first coupler;
   a tray, said tray being rigid and planar, said tray having a back rim, said back rim being arcuate;
   a plurality of connectors, said connectors being coupled to a lower face of said tray, said connectors being complimentary to said supports; and
   wherein said supports are positioned to engage said connectors to couple said tray to at least one of said plurality of brackets.

2. The device of claim 1, further including said support comprising a cup holder.

3. The device of claim 1, further comprising:
   said first couplers comprising tubes, said tubes being hollow;
   said tubes being coupled to said back;
   each said first coupler extending between said opposing side edges;
   said second couplers being tubular and cross-sectionally smaller than said first couplers; and
   wherein each said second coupler is insertable into a respective said first coupler.

4. The device of claim 3, further including said tubes and said second couplers being cylindrical.

5. The device of claim 1, further comprising:
   said plurality of first couplers comprising of between one and fifteen first couplers; and
   said plurality of brackets comprising between one and fifteen brackets.

6. The device of claim 5, further comprising:
   said plurality of first couplers comprising of between four and twelve first couplers; and
   said plurality of brackets comprising between four and twelve brackets.

7. The device of claim 6, further comprising:
   said plurality of first couplers comprising of between six and nine first couplers; and
   said plurality of brackets comprising between six and nine brackets.

8. The device of claim 1, further including said first couplers being substantially evenly spaced along said band.

9. The device of claim 1, further including said first fastener and said second fastener being selected from the group of fasteners consisting of hook and loop fasteners.

10. The device of claim 9, further including said second fastener extending along said front from said second end to proximate to said first end such that said band is adjustable to be positionable around structures having different diameters, and wherein said second fastener is positioned to couple to said first fastener to secure said band to the structure selected by the user.

11. A multiuse bracket and support device comprising:
    a band, said band being flexible, said band have a first end, a second end, opposing side edges, a front and a back;
    a plurality of first couplers, each said first coupler being coupled to said band;
    a first fastener, said first fastener being coupled to said back proximate to said first end;
    a second fastener, said second fastener being coupled to said front proximate to said second end, said second fastener being complimentary to said first fastener;
    a plurality of brackets, each said bracket comprising a second coupler coupled to a support, said second coupler being complimentary to said first coupler; and
    said support comprising:
      a vertical member, said vertical member being coupled to a respective one of said second couplers through an arcuate separator, such that said vertical member and said respective one of said second couplers are substantially parallel and also substantially coplanar with said arcuate separator;
      a stay, said stay having a perimeter defining an opening, said stay being coupled proximate to a top of said vertical member, said stay extending transversely from said vertical member from said arcuate separator;
      a rest, said rest comprising a ring coupled to a spacer, said spacer being coupled proximate to a bottom of said vertical member, said ring and said stay being in substantially parallel planes, such that a center of said ring is in substantial alignment with a central point of said stay and such that said rest is configured to engage the bottom of a container inserted through said opening of said stay; and a brace, said brace being coupled to said bottom of said vertical member, said brace extending from said vertical member transversely from said rest, such that said brace is configured to engage the structure to stabilize said bracket.

12. The device of claim 11, further including said stay and said ring being circular.

13. The device of claim 11, further including said stay comprising an extender, said extender being positioned between and coupled to said perimeter and said vertical member.

14. The device of claim 11, further including said brace comprising a lateral coupled to and extending between said vertical member and a contact member, said contact member being substantially parallel to said vertical member, said brace being substantially coplanar with said vertical member and said first coupler.

15. The device of claim 1, further including said plurality of connectors comprising two connectors, such that said tray is couplable to two said supports.

16. The device of claim 11, further comprising:
said top of said vertical member being open;
a plurality of protectors, each said protector comprising:
  a post, said post having a first terminus and a second terminus,
  a cover, said cover being coupled to said first terminus, said second terminus being insertable into said top of said vertical member,
  said cover being substantially planer and rigid, and
  said cover being complimentary to said stay; and
wherein said top is positioned to receive said post such that said cover will rest on a container placed in said opening of said stay.

17. The device of claim 16, further including said cover being circular.

18. A multiuse bracket and support device comprising:
a band, said band being flexible, said band have a first end, a second end, opposing side edges, a front and a back;
a plurality of first couplers, each said first coupler being coupled to said band, said first couplers comprising tubes, said tubes being hollow, said tubes being coupled to said back, each said first coupler extending between said opposing side edges, said tubes being cylindrical, said plurality of first couplers comprising of between one and fifteen first couplers, said plurality of first couplers comprising of between four and twelve first couplers, said plurality of first couplers comprising of between six and nine first couplers, said first couplers being substantially evenly spaced along said band;
a first fastener, said first fastener being coupled to said back proximate to said first end;
a second fastener, said second fastener being coupled to said front proximate to said second end, said second fastener being complimentary to said first fastener;
said first fastener and said second fastener being selected from the group of fasteners consisting of hook and loop fasteners, said second fastener extending along said front from said second end to proximate to said first end such that said band is adjustable to be positionable around structures having different diameters, and wherein said second fastener is positioned to couple to said first fastener to secure said band to the structure selected by the user;
a plurality of brackets, each said bracket comprising a second coupler coupled to a support, said second coupler being complimentary to said first coupler, said support comprising a cup holder, said plurality of brackets comprising between one and fifteen brackets, said plurality of brackets comprising between four and twelve brackets, said plurality of brackets comprising between six and nine brackets;
each said second coupler being tubular and cross-sectionally smaller than said first coupler, such that each said second coupler is insertable into a respective said first coupler, said second couplers being cylindrical;
said support comprising:
  a vertical member, said vertical member being coupled to a respective one of said second couplers through an arcuate separator, such that said vertical member and said respective one of said second couplers are substantially parallel and also substantially coplanar with said arcuate separator,
  a stay, said stay having a perimeter defining an opening, said stay being coupled proximate to a top of said vertical member, said stay extending transversely from said vertical member from said arcuate separator, said stay being circular, said stay comprising an extender, said extender being positioned between and coupled to said perimeter and said vertical member,
  a rest, said rest comprising a ring coupled to a spacer, said spacer being coupled proximate to a bottom of said vertical member, said ring and said stay being in substantially parallel planes, such that a center of said ring is in substantial alignment with a central point of said stay and such that said rest is configured to engage the bottom of a container inserted through said opening of said stay, and
  a brace, said brace being coupled to said bottom of said vertical member, said brace extending from said vertical member transversely from said rest, such that said brace is configured to engage the structure to stabilize said bracket, said brace comprising a lateral coupled to and extending between said vertical member and a contact member, said contact member being substantially parallel to said vertical member, said brace being substantially coplanar with both said vertical member and said first coupler;
a tray, said tray being rigid and planar, said tray having back rim, said back rim being arcuate;
a plurality of connectors, said connectors being coupled to a lower face of said tray, said connectors being complimentary to said supports, wherein said supports are positioned to engage said connectors to couple said tray to at least one of said plurality of brackets, said plurality of connectors comprising two connectors, such that said tray is couplable to two said supports;
said top of said vertical member being open;
a plurality of protectors, each said protector comprising:
  a post, said post having a first terminus and a second terminus,
  a cover, said cover being coupled to said first terminus, said second terminus being insertable into said top of said vertical member,
  said cover being substantially planer and rigid,
  said cover being complimentary to said stay; and wherein said top is positioned to receive said post such that said cover will rest on a container placed in said opening of said stay; and wherein said band is attachable to a structure with each said first coupler being positioned to couple to a respective said second coupler, such that said supports are positioned to allow the user to secure items to, or rest items on, the supports.

* * * * *